United States Patent [19]

Mussallem, Jr.

[11] Patent Number: 4,504,537
[45] Date of Patent: Mar. 12, 1985

[54] RUG UNDERLAY COMPRISING OPEN LATTICE WITH PARTIALLY FUSED NEEDLE PUNCHED FIBER LAYERS

[75] Inventor: Charles S. Mussallem, Jr., Jacksonville, Fla.

[73] Assignee: No-Muv Corporation, Inc., Jacksonville, Fla.

[21] Appl. No.: 451,012

[22] Filed: Dec. 20, 1982

[51] Int. Cl.$^3$ .............................................. B32B 3/28
[52] U.S. Cl. ................................... 428/167; 264/505; 428/91; 428/95; 428/172; 428/234; 428/235; 428/239; 428/247; 428/252; 428/284; 428/288; 428/300; 428/301
[58] Field of Search ................... 428/91, 95, 134, 137, 428/167, 172, 234, 235, 239, 247, 252, 284, 288, 300, 301; 264/505

[56] References Cited

U.S. PATENT DOCUMENTS 4,360,554 11/1982 Campbell et al. ................... 428/234

Primary Examiner—Marion E. McCamish
Attorney, Agent, or Firm—Arthur G. Yeager

[57] ABSTRACT

A rug underlay comprising a central open lattice of stiffening material, and intermediate layer of fiber batting on each side of the lattice needle punched through the lattice, an upper outer corrugated layer of heat fused fibers, and a lower outer layer of elastomeric material embossed with ridges in a grid design. This article is used as a padding or an underlay for rugs or carpeting in a home or office.

22 Claims, 3 Drawing Figures

RUG UNDERLAY COMPRISING OPEN LATTICE WITH PARTIALLY FUSED NEEDLE PUNCHED FIBER LAYERS

BACKGROUND OF THE INVENTION

Area rugs such as Oriental rugs have been in use in homes and offices for many years but the use of padding under these rugs to reduce shock in walking over the rugs is of relatively recent origin. Initially the padding material was a coarse felt of animal hair and other materials, and somewhat later a sponge rubber pad was introduced. These pads proved to have many deficiences, the most destructive of which was their very low tensile strength, and as a result of which they tended to fall apart after a relatively short period of use. As the pads pulled apart they produced an uneven walking surface, which, in many cases, resulted in damage to the underlying floor, particularly to wood floors. More recently a combination padding material was introduced coatings which produced a considerably higher strength than the previous materials but which did not grip the underlying floor, leaving a possibility of injury from slippage by those walking on the rug. However, this padding was dense, and did provide a better barrier for preventing dirt from filtering through the padding to the floor underneath. Still later padding made from polyurethane was introduced as an improvement over the previous foam rubber material, by polyurethane failed to provide the density and strength properties necessary for a firm rug underlay.

It is an object of this invention to provide a novel rug underlay having nonslip characteristics. It is another object of this invention to provide a rug underlay of fibrous material having a uniform consistency, no unpleasant odor, and a clean appearance. It is still another object of this invention to provide a rug underlay having upper surface that grips the rug above it and a lower surface that does not slip on wood or tile floors. Still other objects will be apparent from a more detailed description of this invention which follows.

BRIEF DESCRIPTION OF THIS INVENTION

This invention provides a rug underlay comprising a central open lattice of stiffening material, an intermediate layer of fiber batting on each side of the lattice, needle punched through the lattice, an upper outer corrugated surface of heat fused fibers, and a lower outer layer of rubbery material embossed with ridges in a grid design. In preferred embodiments of this invention the fiber batting comprises polypropylene fibers, the open lattice is a stiffening structure of polypropylene filaments bonded to each other in a square pattern, and the rubbery material comprises about 60% natural rubber and about 40% synethic latex.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
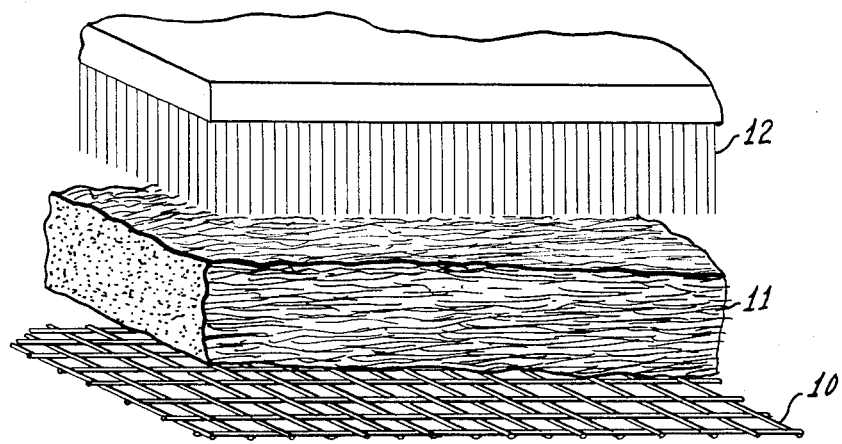
FIG. 1 is a schematic illustration in perspective indicating how layers of the underlay are needle punched into an open lattice stiffener.
Figure 2:
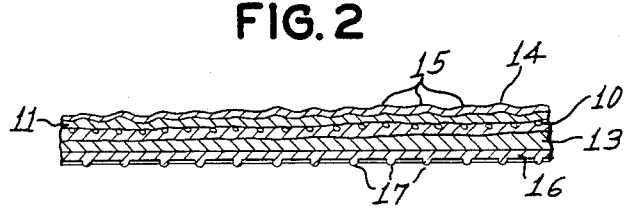
FIG. 2 is a cross section through the rug underlay of this invention.

The central core of the rug underlay of this invention comprises at least two layers of fibrous material compressed into and attached by bonding or otherwise to the two outer surfaces of a central layer of stiffening material. This central core can be made of any of several ways but it has been found most desirable to perform it by a needle punching operation which is depicted in FIG. 1. An open lattice 10 of flexible stiffening material is overlaid with a layer of fiber batting 11 and subjected to a needle punching operation in a press in which a plurality of closely spaced needles 12 are punched through batting 11 and stiffening layer 10 several times until batting 11 is compressed to a very thin dense layer of intertwined fibers with stiffening layer 10 embedded therein. Stiffening layer 10 is preferably a coarse mesh of synthetic filamentary material, such as polypropylene, of about 5–40 mils in diameter. Needle punching is a common operation employed in the fiber industry to intertwine fibers and filaments into a felt-like layer of material. The product produced by the operation just described in FIG. 1 is then turned over and another layer of batting 11 is applied to the opposite surface and needle punched again. These operations are repeated with new layers of batting applied to opposite sides of the layer of embedded stiffening material until a central core has been produced of the desired thickness. The fibers in the batting may be any type of natural or synthetic fibers, although synthetic are preferred such as polyolefin, nylon, polyester, acrylic polymer, etc. Preferably the fibers are polypropylene or mixtures of polypropylene and acrylic polymer. Preferably the central core will have at least one layer of fiber batting having the layer of stiffening material 10 embedded in it and two intermediate layers of batting, one on each side of the central embedded layer. This central core comprises layers 10, 11, and 13 as shown in FIG. 2.

The central core as described above is then treated to produce an upper layer 14 which will cling to the rug that is positioned on the top of the underlay and a lower layers 16 which will provide a nonslip contact with the floor upon which the rug and underlay are positioned. Upper layer 14 is a surface of fused fibers having a stiff hard feeling as compared to the compressed fibers of the central core. Upper layer 14 also has some fiber ends projecting upwardly which can be sensed by rubbing this surface with one's fingers or by looking at the surface through a microscope. These fiber ends produce a good nonyielding contact with the rug when positioned on that surface. A preferred method of producing surface 14 is by applying sufficient heat to partially fuse the fibers at the outer surface of intermediate layer 11 of needle punched fibers described previously. The corrugated appearance 15 of upper layer 14 may be achieved by passing the underlay under a corrugated heated roller which is heated to a sufficiently high surface temperature to cause partial fusing of the fibers in the upper portion of layer 11 as they pass under the roller. This action produces a semistiff corrugated surface 14 that provides an excellent grip for a rug lying on top of the underlay.

It is not critical that corrugations 15 be in any particular design to provide the proper contact between the underlay and the rug resting on the underlay. The design may be parallel ridges and grooves, a geometric design such as squares, triangles, etc; or any other design of ridges and valleys which will provide a good grip on the underneath side of a rug and, at the same time provide a good cushioning, effect.

Figure 3:
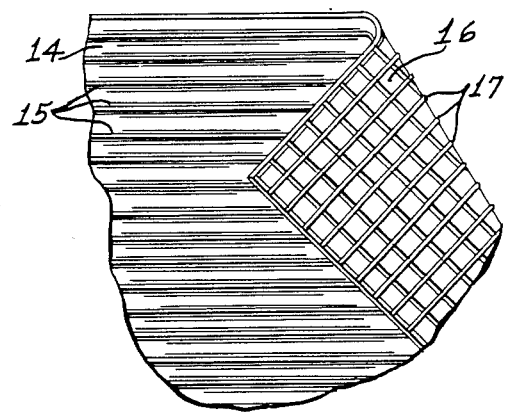
FIG. 3 is a plan view of the top layer of the rug underlay with a portion thereof folded so as to show the lower outside layer of the underlay.

Lower layer 16 is a rubbery substance or elastomeric material which is bonded to the lower surface of the central core of needle punched fibers so as to provide a nonslip contact with a floor made of wood, tile, or the like. This layer is preferably made with a geometric design on its outside surface, such as a square grid pattern of small ridges as shown in FIG. 3. A highly desirable material for layer 16 is one which comprises about 60% by weight natural rubber and 40% by weight synethic latex. It should be understood, however, that any similar rubbery type material is suitable for this purpose. Layer 16 may be preformed and applied to the lower surface of the central core of the underlay by cementing, heat bonding, or the like. Preferably however, layer 16 is formed in place by pouring a liquid molten rubbery material over the lower surface of intermediate layer 13 and subjecting it to the action of a heated roller which presses the rubbery material into the fibrous layer 13 and embosses the grid pattern on layer 16. This structure is then placed in heated evens to cure and finish the rubbery layer. Regardless of how the attachment is made it should be well bonded to the fiber structure so as to provide a good nonslip contact between the underlay and a polished floor of wood, tile, stone, or the like.

FIG. 3 shows the general appearance of the underlay with parallel corrugated formations on upper layer 14 and with the square grid structure of ridges on lower layer 16. An appropriately prepared underlay of the construction described above may have a thickness of about ¼ inch for a weight of approximately 28 ounces or a thicker structure of about ½ inch for a weight of about 48-52 ounces. Thicknesses and weights between these extremes are also readily prepared as may be understood by those skilled in the art.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what is desired to secure by Letters Patent of the United States is:

1. A rug underlay comprising a central open lattice of stiffening material, an intermediate layer of fiber batting on each side of the lattice, needle punched through the lattice, the outside surface of one of said intermediate layers including partially heat fused fibers produced by fusing and corrugating the upper surface of one of said intermediate layers and the outside surface of the other of said intermediate layers being covered with a layer of elastomeric material embossed with ridges in a grid design.

2. A rug underlay of claim 1 wherein said stiffening material is polypropylene.

3. A rug underlay of claim 1 wherein said fiber batting and said fibers are polypropylene.

4. A rug underlay of claim 1 wherein said fiber batting and said fibers are a mixture of polypropylene and acrylic polymer fibers.

5. A rug underlay of claim 1 where said stiffening lattice is incorporated into a central layer of needle punched batting, and an intermediate layer is needle punched into each side of the central layer.

6. A rug underlay of claim 1 wherein said partially heat fused fibers are produced by applying a heated corrugation-producing surface to said outside surface of one of said intermediate layers to cause melting of the fibers on the heated surface of that intermediate layer.

7. A rug underlay of claim 1 wherein said layer is a rubbery material embossed with a square grid pattern of ridges.

8. A rug underlay of claim 7 wherein the rubbery material is a mixture of about 60% natural rubber and 40% synthetic latex.

9. A rug underlay comprising a central open lattice of stiffening material sandwiched between two compressed needle punched fibrous intermediate layers, the upper outer surface of one of said intermediate layers being partially heat fused fibers produced by fusing and corrugating the upper surface of one of said intermediate layers, and a lower outer layer of a rubbery material as the outside surface of the other of said intermediate layers with an embossed grid pattern on the outside surface of said lower outer layer.

10. A rug underlay of claim 9 wherein said fibrous layers comprise polypropylene fibers.

11. A rug underlay of claim 10 wherein said fibrous layers consist essentially of a mixture of polypropylene fibers and acrylic polymer fibers.

12. A rug underlay of claim 9 wherein said central open lattice includes an open square lattice of synthetic plastic filament.

13. A rug underlay of claim 12 wherein the synthetic plastic is polypropylene.

14. A rug underlay of claim 9 wherein said fibrous layers are prepared by needle punching a batting of fibers into a contiguous fibrous layer to produce a thin compressed fibrous layer.

15. A rug underlay comprising a central layer of polypropylene fiber needle punched and compressed into an open lattice, square pattern of polypropylene filament, an intermediate layer of polypropylene fiber on each side of the central layer, needle punched and compressed into the central layer, the outside surface of one of said intermediate layers being a corrugated pattern of partially heat fused fibers, and an outer layer of rubbery material bonded to the outside surface of the other of said intermediate layers, the outside surface of said outer layer being embossed with a square grid pattern of ridges.

16. A rug underlay of claim 15 wherein each of said needle punched layers of fiber is a mixture of polypropylene fiber and acrylic polymer fiber.

17. A method of preparing a rug underlay which comprises subjecting a stiffening lattice and a first layer of fiber batting to the action of a needle punch press until the fiber batting is intertwined with the lattice and the resulting structure is compressed into a first thin layer, subjecting the opposite surface of the thin layer and a second layer of fiber batting to the action of a needle punch press until the fiber batting is intertwined with the first thin layer and the resulting structure is compressed into a second thin layer slightly thicker than the first thin layer, repeating the previous step sufficient times to successively alternate sides of the resulting layer to produce the desired thickness of a compressed fiber structure, subjecting the upper surface of the compressed fiber structure to heat and pressure to produce a corrugated surface of partially heat fused fibers, and bonding to the lower surface of the compressed fiber structure a grid embossed layer of a rubbery material.

18. The method of claim 17 wherein the compressed fiber structure is about ¼ to ½ inch thick.

19. The method of claim 17 wherein said stiffening lattice is a sheet of open lattice spaced polypropylene filaments forming a mesh of small rectangular open spaces between filaments bonded to each other at points of intersection.

20. The method of claim 17 wherein the fibers of the batting are polypropylene fibers.

21. The method of claim 17 wherein the fibers of the batting are mixtures of polypropylene fibers and acrylic polymer fibers.

22. The method of claim 17 wherein the rubbery material is a mixture of about 60% natural rubber and 40% synthetic latex.

* * * * *